3,115,494
2-AMINO-5,6-DIHYDRO-4H-1,3-OXAZINES AND A PROCESS FOR THEIR PREPARATION

Joseph Albert Meschino, North Wales, and George Ireland Poos, Ambler, Pa., assignors to McNeil Laboratories, Incorporated, a corporation of Pennsylvania
No Drawing. Filed Oct. 13, 1961, Ser. No. 144,842
12 Claims. (Cl. 260—244)

This invention relates to a new series of organic compounds, their salts and methods for their preparation.

The novel compounds can be generally defined as belonging to the genus 2-amino-5,6-dihydro-5-$R_1$,$R_2$-4H-1,3-oxazine wherein at least one of $R_1$,$R_2$ is alkyl, aryl, aralkyl or heteroalkyl and the other is hydrogen, aryl, aralkyl or heteroalkyl.

Suitable alkyl substitutents are lower alkyl groups containing from 1 to 7 carbon atoms, i.e. saturated aliphatic chains, straight or branched, e.g. methyl, ethyl, propyl, isopropyl, n-butyl, isobutyl, pentyl, isopentyl, hexyl, etc. Aryl groups are substituted or unsubstituted aromatic lower carbocyclic aryl radicals such as phenyl, tolyl or nahthyl. Substituents in these aromatic nuclei may be, for example, hydroxyl; lower alkyl; lower alkoxy; halo or amino—primary, secondary or tertiary. Aralkyl substituents include benzyl, phenylethyl, diphenylmethyl, diphenylethyl, etc. which may, if desired, be further substituted, e.g. by alkyl, alkoxy, dialkoxy, or alkylenedioxy groups such as one or more of the following: methyl, ethyl, propyl, isopropyl, butyl, isobutyl, pentyl, isopentyl, methoxy, ethoxy, propoxy, butoxy, pentoxy or methylenedioxy. Examples of such substituents include methoxybenzyl; 3,4-dimethoxybenzyl; 3,4,5-dimethoxybenzyl; 3,4,5 - triethoxybenzyl; 3,4 - methylenedioxybenzyl. Heteroalkyl substituents include those containing from four to five carbon atoms interrupted by oxygen, nitrogen or sulphur linkages, joined to the oxazine nucleus through a lower alkyl, i.e. methyl, ethyl or propyl group, the hetero function being pyridyl, thienyl, furyl, pyrimidyl, pyrazinyl, indolyl, thiazolyl, etc. Specific examples include: pyridylmethyl, pyrimidylmethyl, indolylmethyl and higher homologs of these.

The compounds of this invention may be converted to their therapeutically useful acid addition salts by reaction with an appropriate acid as, for example, an inorganic acid such as a hydrohalic acid, i.e. hydrochloric, hydrobromic or hydriodic acid; sulfuric, nitric or thiocyanic acid; a phosphoric acid; an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, benzenesulfonic, p-toluenesulfonic, salicyclic, p-aminosalicylic, 2-phenoxybenzoic or 2-acetoxybenzoic acid.

Depending upon the conditions employed during the course of the reaction, the novel compounds are obtained either in the form of the free bases or salts thereof. The salts are converted to the free bases in the usual manner, e.g. by reaction with alkali such as sodium or potassium hydroxide. The bases can be converted to their therapeutically useful acid addition salts by reaction with an appropriate organic or inorganic acid.

The compounds of this invention, including their therapeutically active acid addition salts are useful as central nervous system stimulants. They may be used in the form of pharmaceutical preparations which contain the compounds, or their acid addition salts, in admixture with a pharmaceutical organic or inorganic solid or liquid carrier suitable for oral or parenteral administration. For formulating the preparations one may employ substances which do not react with the new compounds, such as water, gelatin, lactose, starches, magnesium stearate, talc, vegetable oils, gums, polyalkylene glycols, etc. The pharmaceutical preparations may be in the form of tablets, pills, capsules or in liquid form such as solutions, suspensions or emulsions. If desired, the novel compounds may be formulated with other therapeutically active substances. The actual dose administered in therapy depends essentially on the condition of the individual patient and the desires of the practicing physician. Understandably, the novel compounds need not be limited to human therapy but may find wide, if not greater, application in the veterinary field. Thus, they may be administered to animals, both domestic and laboratory, in the course of treatment or, if desired, experimentally.

The novel 2-amino-5,6-dihydro-5-$R_1$,$R_2$-4H-1,3-oxazines are prepared by cyclization of the correspondingly substituted 3-amino-2-$R_1$,$R_2$-1-propanol. The latter is treated with a cyanogen bromide to give the intermediate cyanamide alcohol. Ring closure to the oxazine is spontaneous or requires acid catalysts depending upon the nature of the product.

Conversion of the propanol to the cyanamide derivative is advantageously conducted in the presence of a weak base such as alkali or alkaline earth metal salt of a fatty acid, carbonate, bicarbonate or hydroxide. Sodium acetate is preferred for this purpose. The reaction is conducted in an aqueous or nonaqueous organic solvent such as, preferably, a lower alkanol, e.g. methanol or ethanol; isopropanol, benzene, toluene, xylene, aqueous dioxane, pyridine or di-n-butyl ether.

Where a proton donor, e.g. hydrogen chloride, is used to facilitate ring closure, the acid-catalyzed reaction is conducted in an inert nonpolar organic solvent such as ether, benzene, toluene, chlorobenzene, xylene, tetrahydrofuran or diethylether.

The starting materials used for the preparation of the novel 2-amino-5,6-dihydro-5-$R_1$,$R_2$-4H-1,3-oxazines are prepared by reduction of the corresponding cinnamonitrile, cyanoacetate or propionitrile (as the case may be) with a di-light metal hydride such as an alkali metal aluminum hydride, for example lithium aluminum hydride; alkali metal borohydride, e.g. lithium, sodium or potassium borohydride. These reducing agents may be employed in the presence of suitable solvents such as ethers, for example diethylether, diethyleneglycol, dimethylether, tetrahydrofuran or dioxane, and alcohols such as methanol, ethanol, 2-propanol or 2-butanol.

Compounds leading to the preparation of the intermediate cinnamonitriles, cyanoacetates and propionitriles are described in the copending application of Joseph Albert Meschino, filed April 19, 1961, Serial No. 103,985. In a general way, it may be stated that they can be prepared by reduction of the appropriate nitrile ester with a hydrogenating agent in the presence of an organic solvent as, for example, α-cyano-β-phenyl cinnamate is treated with sodium borohydride in 2-propanol to give α-hydroxymethyl-β-phenylhydrocinnamonitrile.

The following examples are intended to illustrate but not to limit the scope of the present invention.

Example I

To a suspension of 2.5 parts by weight of lithium aluminum hydride in 75 parts by volume of ether is added, dropwise with stirring, a solution of 4.3 parts by weight of α-hydroxymethyl-β-phenylhydrocinnamonitrile in 100 parts by volume of ether. After stirring at room temperature overnight, the excess hydride is destroyed with water and the resulting mixture filtered. Concentration of the filtrate gives 3-amino-2-diphenylmethyl-1-propanol as a crystalline solid, melting point 96° C.–98° C.

To a solution of 8 parts by weight of the above-prepared material in 60 parts by volume of methanol is added 5.6 parts by weight of sodium acetate in a mixture of 20 parts by volume of water and 50 parts by volume of methanol. After cooling the homogeneous mixture in an ice-bath, a solution of 3.6 parts by weight of cyanogen bromide in 50 parts by volume of methanol is added dropwise. After a few minutes, the mixture is brought to room temperature and stirring for a period of 8 hours.

The solution is then concentrated to near dryness in vacuo and the residue diluted with 50 parts by volume of water. The resulting white precipitate is extracted into ether. After drying the ether solution over anhydrous potassium carbonate, it is treated with anhydrous hydrogen chloride which precipitates the product, 2-amino-5-diphenylmethyl-5,6-dihydro-1,3-oxazine as its hygrosopic hydrochloride salt. The oxazine is finally converted to its fumarate salt, melting point 209–211° C.

*Example II*

To a suspension of 8.5 parts by weight of lithium aluminum hydride in 200 parts by volume of ether is added, dropwise with stirring, a solution of 20 parts by weight of ethyl diphenylcyanoacetate in 200 parts by volume of ether. After stirring for three hours, the excess hydride is destroyed with water and the mixture filtered. Concentration of the filtrate gives 3-amino-2,2-diphenyl-1-propanol, melting point 104–107° C.

To a solution of 12 parts by weight of 3-amino-2,2-diphenyl-1-propanol in 100 parts by volume of methanol is added 9.5 parts by weight of sodium acetate in a mixture of 25 parts by volume of water and 70 parts by volume of methanol. After cooling in an ice-bath, a solution of 6.1 parts by weight of cyanogen bromide in 50 parts by volume of methanol is added dropwise and the homogeneous solution stirred at room temperature for eight hours.

The solution is then concentrated to near dryness in vacuo and the residue diluted with 50 parts by volume of water. The organic material is extracted into methylene chloride after which it is dried over anhydrous potassium carbonate. Concentration of the solution leaves an oily residue which when dissolved in ethanol and treated with a half equivalent of fumaric acid gives the product, 2-amino-5,5-diphenyl-5,6-dihydro-1,3-oxazine, as its normal fumarate salt, melting point 142° C. (dec.).

*Example III*

To a suspension of 8.5 parts by weight of lithium aluminum hydride in 200 parts by volume of ether is added, dropwise with stirring, a solution of 30 parts by weight of α-hydroxymethyl - 3,4 - methylene - dioxyhydrocinnamonitrile in 200 parts by volume of ether. After stirring for three hours, the excess hydride is destroyed with water and the mixture filtered. Concentration of the filtrate gives 3-amino - 2 - [3,4 - methylenedioxybenzyl]-1-propanol which is converted to the fumarate salt, melting point 165–167° C.

To a cooled solution of 10.6 parts by weight of cyanogen bromide in 100 parts by volume of methanol is added, dropwise, a solution of 20 parts by weight of the above-prepared amino-alcohol and 8.2 parts by weight of sodium acetate in 100 parts by volume of methanol. After several minutes, the mixture is brought to room temperature and stirred for eight hours.

Several ml. of aqueous ammonia is then added and the mixture concentrated to near dryness in vacuo. The residue is dissolved in ether, washed once with water and dried over anhydrous potassium carbonate after which the solution is filtered and treated with anhydrous hydrogen chloride. The product, 2-amino-5,6-dihydro-5-[3,4 - methylenedioxybenzyl]-4H-1,3-oxazine, precipitates as a hygroscopic hydrochloride salt. It is finally converted to a normal fumarate salt, melting point 178–180° C.

*Example IV*

To a suspension of 5.6 parts by weight of lithium aluminum hydride in 150 parts by volume of ether is added, dropwise with stirring, a solution of 10 parts by weight of ethyl methylphenylcyanoacetate [Wideguist, Chem. Zentr. II, 1184 (1943)], in 100 parts by volume of ether. The resulting mixture is stirred at room temperature for eight hours and finally refluxed for 1.5 hours. The excess hydride is then destroyed with water after which the mixture is filtered and the inorganic salts washed with methylene chloride.

The combined organic solutions are concentrated to dryness after which the residue is separated into basic and neutral fractions in standard fashion.

The basic fraction yields 3-amino-2-methyl-2-phenyl-1-propanol which is identified as a fumarate salt, melting point 114° C. (subl.).

To a cooled solution of 0.6 part by weight of cyanogen bromide in 20 parts by volume of methanol is added a solution of 1 part by weight of 3-amino-2-methyl-2-phenyl-1-propanol and 0.5 part by weight of sodium acetate in 20 parts by volume of methanol. After several minutes the mixture is brought to room temperature and stirred for eight hours.

Several ml. of aqueous ammonia is then added and the mixture concentrated to near dryness in vacuo. The residue is extracted into ether and washed once with water after which it is dried over anhydrous potassium carbonate, filtered and treated with anhydrous hydrogen chloride. The product, 2-amino-5,6-dihydro-5-methyl-5-phenyl-4H-1,3-oxazine, precipitates as a hygroscopic hydrochloride salt which is then converted to the normal fumarate salt, melting point 230° C. (dec.), by a standard method.

*Example V*

To a suspension of 4.7 parts by weight of lithium aluminum hydride in 150 parts by volume of tetrahydrofuran is added, dropwise with stirring, a solution of 5.5 parts by weight of α-hydroxymethyl-3,4,-dimethoxyhydrocinnamonitrile in 25 parts by volume of tetrahydrofuran. The resulting mixture is stirred for eight hours after which the excess hydride is destroyed with water. The mixture is filtered and the filtrate is concentrated to give 3-amino-2-[3,4-dimethoxybenzyl]-1-propanol characterized as its fumarate salt, melting point 162–163° C.

To a cooled solution of 2.5 parts by weight of cyanogen bromide in 75 parts by volume of methanol is added a solution of 5.4 parts by weight of the above-prepared amino-alcohol and 1.9 parts by weight of sodium acetate in 100 parts by volume of methanol. After several minutes, the mixture is brought to room temperature and stirred for eight hours.

Several ml. of aqueous ammonia is then added and the mixture concentrated to near dryness in vacuo. The residue is extracted into ether, washed once with water and dried over anhydrous potassium carbonate. The filtered solution is subsequently treated with anhydrous hydrogen chloride, precipitating the product, 2-amino-5,6-dihydro-5-[3,4-dimethoxybenzyl]-4H-1,3-oxazine as the hydrochloride salt. It is then converted to the normal fumarate, melting point 196.5–197° C. by a standard method.

*Example VI*

To a suspension of 4.5 parts by weight of lithium aluminum hydride in 150 parts by volume of tetrahydrofuran is added, dropwise with stirring, a solution of 6 parts by weight of α-hydroxymethyl-4-methoxyhydrocinnamonitrile in 25 parts by volume of tetrahydrofuran. The resulting mixture is stirred for eight hours after which the excess hydride is destroyed with water. After filtering, the organic solution is concentrated to yield 3-amino-2-[4-methoxybenzyl]-1-propanol characterized as its fumarate salt.

To a cooled solution of 5 parts by weight of cyanogen bromide in 125 parts by volume of methanol is added a solution of 10.5 parts by weight of the above-prepared amino-alcohol and 4 parts by weight of sodium acetate in 150 parts by volume of methanol. After several minutes, the solution is brought to room temperature and stirred for eight hours.

Several ml. of aqueous ammonia is then added and the mixture concentrated to near dryness in vacuo. The residue is extracted into ether, washed once with water and dried over anhydrous potassium carbonate. The filtered solution is subsequently treated with anhydrous hydrogen chloride precipitating the product, 2-amino-5,6-dihydro-5-[4-methoxybenzyl]-4H-1,3-oxazine, as the hydrochloride salt. It is finally converted to the more convenient fumarate salt by a standard method.

*Example VII*

To a suspension of 5.6 parts by weight of lithium aluminum hydride in 150 parts by volume of ether is added, dropwise with stirring, a solution of 10 parts by weight of α-hydroxymethyl-β-(4-pyridyl)-propionitrile in 100 parts by volume of ether. The resulting mixture is stirred for eight hours after which the excess hydride is destroyed with water. The mixture is filtered and the filtrate is concentrated to give 3-amino-2-[4-pyridylmethyl]-1-propanol.

To a cooled solution of 6 parts by weight of cyanogen bromide in 150 parts by volume of methanol is added a solution of 10 parts by weight of the above-prepared amino-alcohol and 5 parts by weight of sodium acetate in 200 parts by volume of methanol. After several minutes, the mixture is brought to room temperature and stirred for eight hours.

Several ml. of aqueous ammonia is then added and the mixture concentrated to near dryness in vacuo. The residue is extracted into ether and washed once with water after which it is dried over anhydrous potassium carbonate, filtered and treated with anhydrous hydrogen chloride. The product, 2-amino-5,6-dihydro-5-[4-pyridylmethyl]-4H-1,3-oxazine, precipitates as the dihydrochoride salt.

*Example VIII*

To a cooled, stirred suspension of .84 parts by weight of sodium borohydride in 50 parts by volume of 2-propanol is added slowly 5 parts by weight of solid ethyl α-cyano-p-isopropylcinnamate. The mixture is stirred for eighteen hours at room temperature, after which the excess borohydride is destroyed with aqueous acetic acid and the resulting mixture is concentrated under reduced pressure. The residue is taken up in methylene chloride and washed with dilute potassium carbonate and finally with water. After drying over anhydrous magnesium sulfate, the solvent is removed under reduced pressure to yield α-hydroxymethyl-p-isopropylhydrocinnamonitrile, boiling point 142° C./0.1 mm.

To a suspension of 4.8 parts by weight of lithium aluminum hydride in 150 parts by volume of ether is added, dropwise with stirring, a solution of 5.6 parts by weight of α-hydroxymethyl-4-isopropylhydrocinnamonitrile in 50 parts by volume of ether. Stirring is continued for about eight hours after which the excess hydride is destroyed with water and the solution filtered. The filtrate is concentrated to give the product, 3-amino-2-[4-isopropylbenzyl]-1-propanol. The hydrochloride melts at 171–172° C.

To a cooled solution of 2.5 parts by weight of cyanogen bromide in 75 parts by volume of methanol is added a solution of 5.5 parts by weight of the above-prepared amino-alcohol in 100 parts by volume of methanol containing 2 parts by weight of sodium acetate. After several minutes, the mixture is brought to room temperature and stirred for eight hours.

Several ml. of aqueous ammonia is then added and the mixture concentrated to near dryness in vacuo. The residue is extracted into ether, washed once with water and dried over anhydrous potassium carbonate. After filtration the solution is treated wtih anhydrous hydrogen chloride to precipitate the product, 2-amino-5,6-dihydro-5-[4-isopropylbenzyl]-4H-1,3-oxazine, as the hydrochloride salt, which is converted to a fumarate, melting point 194–196° C., by a standard method.

What is claimed is:

1. A member of the group consisting of 2-amino-5-$R_1$,$R_2$-5,6-dihydro-4H-1,3-oxazines wherein one of $R_1$ and $R_2$ is a member of the group consisting of lower alkyl, diphenyl lower alkyl, diphenyl, lower alkylene dioxybenzyl, phenyl, di-lower alkoxy benzyl, lower alkoxy benzyl, pyridyl lower alkyl and lower alkyl benzyl, and the other is a member of the group consisting of hydrogen, diphenyl lower alkyl, diphenyl, lower alkylene dioxybenzyl, phenyl, di-lower alkoxy benzyl, lower alkoxy benzyl, pyridyl lower alkyl and lower alkyl benzyl, and therapeutically active, nontoxic acid addition salts thereof.

2. 2-amino-5,6-dihydro-5-diphenylmethyl-4H-1,3-oxazine.

3. 2-amino-5,6-dihydro-5,5-diphenyl-4H-1,3-oxazine.

4. 2-amino-5,6-dihydro-5-(3,4-methylenedioxybenzyl)-4H-1,3-oxazine.

5. 2-amino-5,6-dihydro-5-methyl-5-phenyl-4H-1,3-oxazine.

6. 2-amino-5,6-dihydro-5-(3,4-dimethoxybenzyl)-4H-1,3-oxazine.

7. 2-amino-5,6-dihydro-5-(4-methoxybenzyl)-4H-1,3-oxazine.

8. 2-amino-5,6-dihydro-5-(4-pyridylmethyl)-4H-1,3-oxazine.

9. 2-amino-5,6-dihydro-5-(4-isopropylbenzyl)-4H-1,3-oxazine.

10. The method which comprises treating 3-amino-2-$R_1$,$R_2$-1-propanol, wherein one of $R_1$ and $R_2$ is a member of the group consisting of lower alkyl, diphenyl lower alkyl, diphenyl, lower alkylene dioxybenzyl, phenyl, di-lower alkoxy benzyl, lower alkoxy benzyl, pyridyl lower alkyl and lower alkyl benzyl and the other is a member of the group consisting of hydrogen, diphenyl lower alkyl, diphenyl, lower alkylene dioxybenzyl, phenyl, di-lower alkoxy benzyl, lower alkoxy benzyl, pyridyl lower alkyl and lower alkyl benzyl, with a cyanohalide.

11. A method as set forth in claim 10 wherein the intermediately formed cyanamide alkanol is cyclized by the addition of hydrogen chloride.

12. A method as set forth in claim 10 wherein the cyano halide is cyanogen bromide.

No references cited.